United States Patent [19]
Lemelson

[11] 3,874,207
[45] Apr. 1, 1975

[54] EXTRUSION APPARATUS
[76] Inventor: Jerome H. Lemelson, 85 Rector St., Metuchen, N.J. 08840
[22] Filed: Feb. 1, 1967
[21] Appl. No.: 623,167

Related U.S. Application Data
[63] Continuation of Ser. Nos. 691,622, Oct. 22, 1957, Pat. No. 3,002,615, and Ser. No. 142,405, Oct. 2, 1961, Pat. No. 3,422,648, and Ser. No. 516,280, Dec. 27, 1965, abandoned.

[52] U.S. Cl. .......................... 72/56, 72/256, 72/270, 425/174.8
[51] Int. Cl. ............................................ B30b 11/22
[58] Field of Search ........ 425/174, 174.8 R; 72/253, 72/56, 256, 270, 264, 268, 271, 273; 148/12.9

[56] References Cited
UNITED STATES PATENTS

| | | | |
|---|---|---|---|
| 1,924,294 | 8/1933 | Shirk et al. | 72/253 |
| 2,783,499 | 3/1957 | Billen | 425/376 |
| 2,967,613 | 1/1961 | Ellis et al. | 29/420.5 |
| 3,002,614 | 10/1961 | Jones | 72/56 |
| 3,113,676 | 12/1963 | Harkenrider | 72/253 |
| 3,153,820 | 10/1964 | Criner | 164/250 |
| 3,232,087 | 2/1966 | Baxter | 72/56 |
| 3,233,012 | 2/1966 | Bodine, Jr. | 72/56 |
| 3,400,180 | 9/1968 | Buttner et al. | 264/24 |

Primary Examiner—Richard J. Herbst

[57] ABSTRACT

An extrusion apparatus and method employing one or more forms of auxilliary energy to effect, enhance or improve extrusion and the product formed therefrom. The auxilliary energy is imparted to the extrusion material and the shaping apparatus therefore by means of electrical coils and/or other transducers. The coils or transducers may be disposed within or surrounding one or more of the components of the extrusion apparatus and may be operated continuously or intermittently in a predetermined manner such as by programming the energization thereof to predeterminately affect the material being extruded.

10 Claims, 6 Drawing Figures

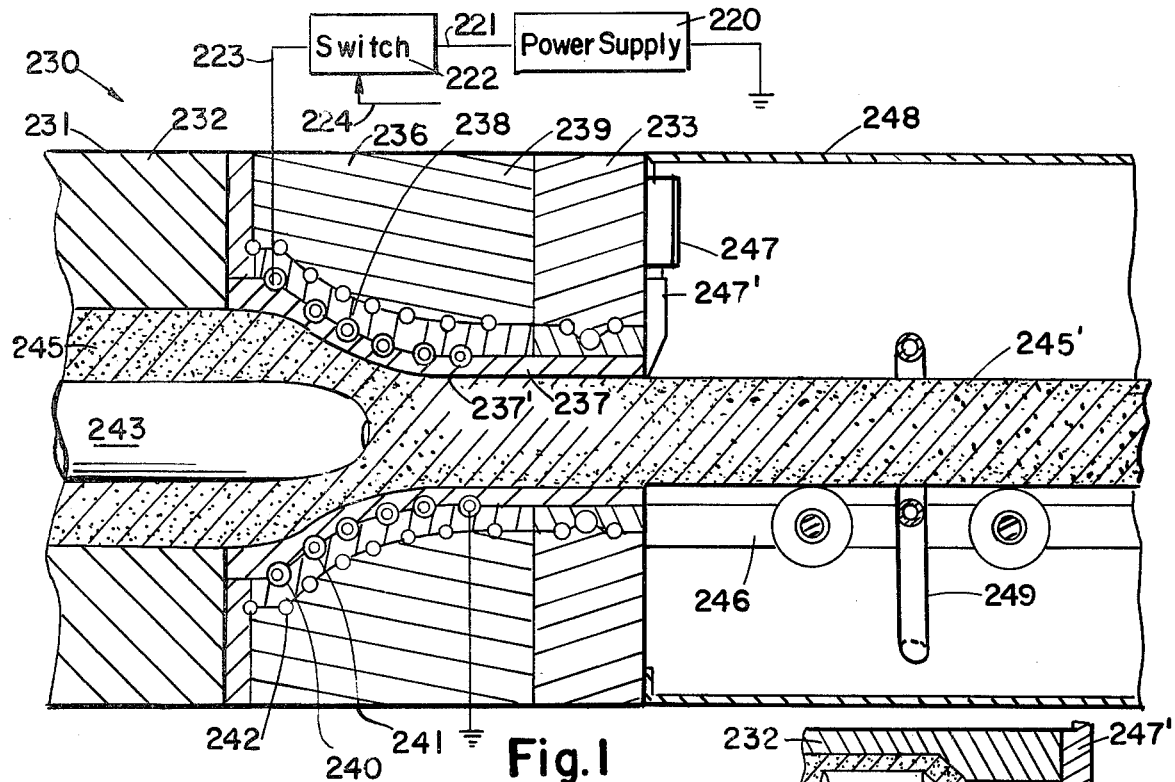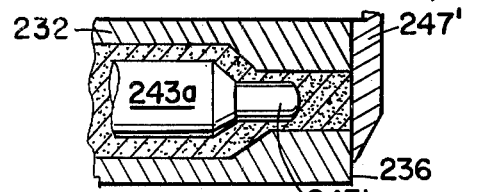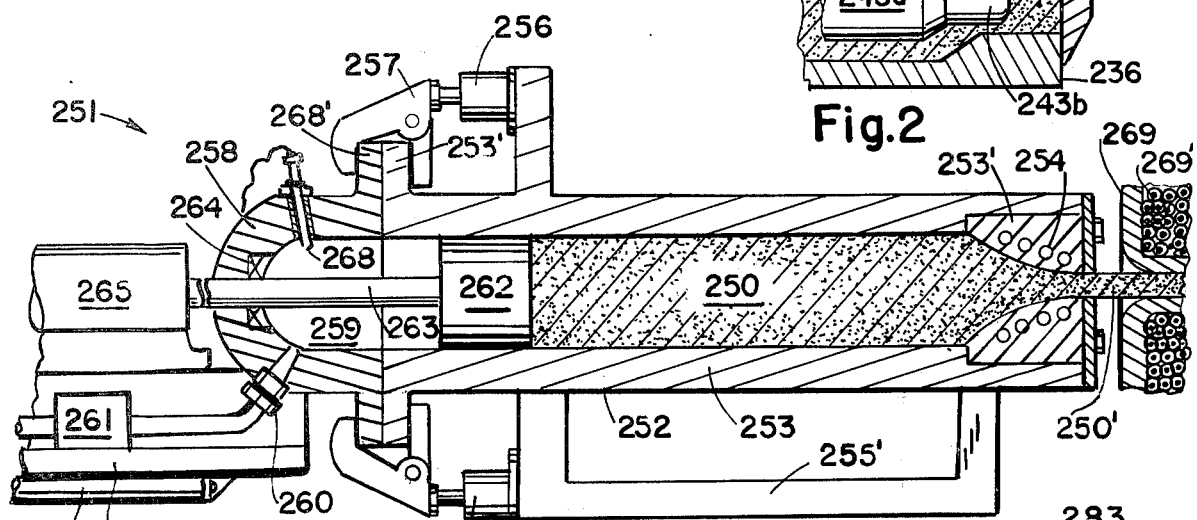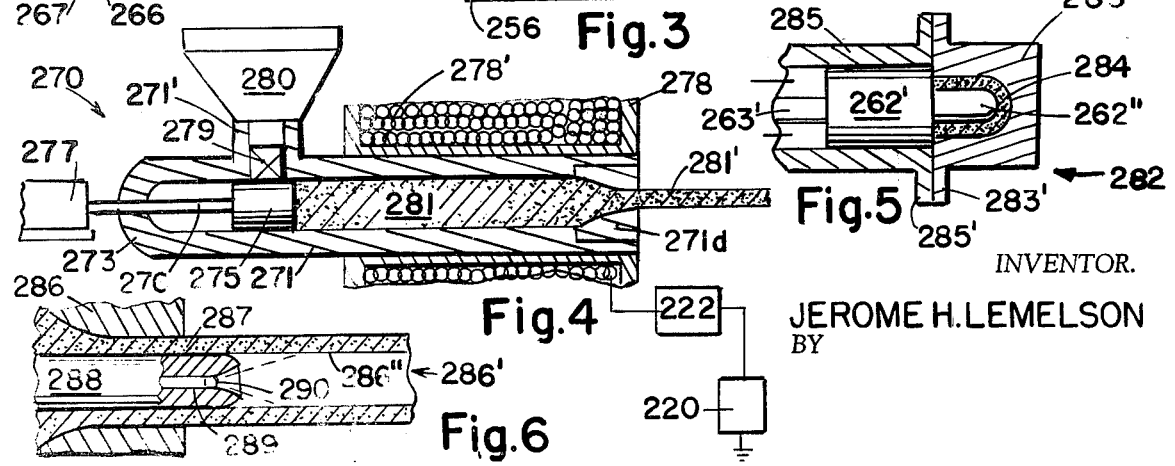
INVENTOR.
JEROME H. LEMELSON

EXTRUSION APPARATUS

RELATED APPLICATIONS

This application is a continuing application based on my prior copending applications, Ser. No. 691,622 filed Oct. 22, 1957 now U.S. Pat. No. 3,002,615 and Reissue Pat. Re 25,570 and application Ser. No. 142,405 filed Oct. 2, 1961 now U.S. Pat. No. 3,422,648. This is also a continuing application based on disclosures found in application Ser. No. 516,280 filed Dec. 27, 1965 now abandoned.

SUMMARY OF THE INVENTION

The invention is an apparatus and method for extruding various materials including metals, ceramics and plastic materials to define elongated shapes in which extrusion is effected and/or the material of the extrusion is enhanced in its characteristics by applying one or more forms of energy such as radiant energy to the extruding apparatus and material being extruded. The radiant energy, in one form of the invention, may comprise vibratory energy imparted to the extrusion material through one or more of the components of the extruder, extrusion die or auxilliary apparatus. Such auxilliary energy is also provided in the form of electrical induction means and or intense variable magnetic fields imparted to the extruding material by means of one or more electrical coils surrounding or secured within the extrusion chamber, extrusion die, extrusion mandrel or adjacent thereto.

Vibratory energy such as ultrasonic waves or shock waves imparted to the extruding material through the extrusion prime mover, extrusion chamber, die or die mandrel is employed to move or cooperate in moving the extrusion material as well as to enhance the physical characteristics of the extrusion itself. In a particular form of the invention the energy release by one or more explosions is employed to move the extrusion material through the extrusion die.

BRIEF DESCRIPTION OF THE DRAWINGS

FIG. 1 is a side elevational view with parts broken away and sectioned for clarity of a portion of an extrusion machine and auxilliary means for predeterminately affecting extrusion material;

FIG. 2 is a side elevational view of a modified form of the apparatus of FIG. 1 also shown in cross section;

FIG. 3 is a side elevational view with parts broken away and sectioned of a modified form of extrusion apparatus employing explosion means for effecting extrusion;

FIG. 4 is a side view in cross section of an apparatus for extruding powdered or fluent material with auxilliary means provided for controlling extrusion and affecting the extrusion material in a manner so as to improve the physical characteristics thereof;

FIG. 5 is a side view with parts broken away for clarity of an impact or compression extrusion and molding apparatus employing features of the invention and FIG. 6 is a fragmentary view of an extrusion apparatus of the type provided in the other figures and modified with radiant energy generating means for affecting the extrusion material as it extrudes.

It is a primary object of the current invention to provide a new and improved extrusion apparatus employing other than conventional extrusion means for working and moving extrusion material and methods for effecting said working and moving.

Another object is to provide an extrusion apparatus employing one or more forms of radiant energy including short wave, magnetic and sonic forms of energy for reacting or extruding material to effect or simplify the extrusion thereof and change or enhance its physical and chemical characteristics.

Another object is to provide an extrusion apparatus having auxilliary heating means for the extrusion material disposed adjacent to or within the extrusion chamber and/or extrusion die for heating and uniting extrusion material fed thereto.

Another object is to provide improved apparatus and methods for ultrasonically treating extrusion material as it is formed to shape.

Another object is to provide an improved apparatus and method for extruding and solidifying powdered or particulate materials.

Another object is to provide an improved apparatus and method for compacting or densifying various materials prior to their extrusion to shape.

Another object is to provide an improved extrusion method wherein the extrusion material is retained within the extrusion chamber and worked by imparting vibrations or shock waves thereto prior to forcing same through an extrusion die.

Another object is to provide a new and improved extrusion apparatus for extruding materials which are generally difficult to extrude.

Another object is to provide means for reducing the structure and wall thickness of an extrusion apparatus.

Another object is to provide an extrusion apparatus employ-shock waves, explosions and the expansion of gases to provide the forces required to effect extrusion.

In copending application Ser. No. 142,405 is provided an extrusion apparatus applicable for the extrusion of various metals, ceramics and polymers which apparatus employs a program control means for automatically controlling extrusion variables by varying the output of various servo operated or controlled devices. Reproducible recordings on a record bearing member are used to generate respective electrical signals of constant or predetermined variable characteristics which are employed to activate and deactivate or change the operation of various electrical devices during extrusion to predeterminately control the rate of extrusion as well as to vary the shape of the extrusion. Extrusion rate is varied by varying the force applied to the extrusion material by a prime mover such as a piston or extrusion screw.

In one form of the current invention, variable forces such a simple vibrations, impacts, ultrasonic vibrations and/or shock waves may be applied per se, simultaneously or in sequence to the extrusion material to work and or move the extrusion material through the extruder. The application of such forces may be effected by and under the control of such means as provided in said copending application Ser. No. 142,405. Shock wave generating and applying means as disclosed in copending application Ser. No. 668,561 entitled Wave Generating Apparatus may be modified and applied in the present application for applying shock waves to the prime moving means for the extrusion material and/or the extrusion material itself as a series of intermittent shock waves generated at a predetermined frequency which may vary from one or more cycles per second or less to a resonant frequency in which the waves reinforce each other. Said vibrations or shock waves may be imparted to the extrusion piston or screw by oscillating same in a direction parallel to the direction of material flow by properly controlling operation of the prime moving means for said piston or screw such as by properly programming the program control means defined in Ser. No. 142,405, by properly operating one or more electrically operated transducers disposed within or surrounding the walls of the extrusion chamber or extrusion die or by controlling the rate of exploding a fuel or chemical explosive behind the extrusion piston or screw or in direct contact with the extrusion material as will be more fully described hereafter.

The transducing means employed to impart shocks, vibrational, magnetic or other forms of radiant energy to the extruding material may be controlled in their operation by the same program control means defined in application Ser. No. 142,405 which is used to control other extrusion variables such as extrusion piston or screw movement, die tooling movement, feed rate of extrusion material, etc. In a like manner, the same program control means may also be employed herein to control the operation of the other described variable extrusion apparatus such as coolant fluid flow, means opening and closing the extrusion chamber, fuel injection, induction or radio-frequency energy generation and intensity thereof, beam generating means, flow restraining or stopping tooling, etc.

In FIG. 1 is shown part of an extrusion apparatus which is designated by the general notation 230 and includes means (not shown) for supplying and feeding an extrusion material to an extrusion chamber 231' terminating an extrusion machine or extruder 231 for predeterminately shaping said material to form an extrusion M' thereof in passing through a die associated with said extruder. The extrusion apparatus 230 may be operative to provide solid extrusions and/or hollow extrusions depending on the location of an extrusion mandrel 243 with respect to the throat of the extrusion die 236.

Extrusion apparatus of the type illustrated in FIG. 1 may be used for the extrusion of various materials and, as hereinafter provided, includes auxilliary means to be described for facilitating or effecting extrusion and/or improving the macro and microstructure of the material forming the extrusion formed therein. The material being extruded may comprise one or more or various metals, metal alloys, metallic compounds such as ceramics or plastics such as thermoplastic polymers which are provided initially as fed to or through the extrusion chamber in solid of billet form, pellet or powder form or in a molten or semi-molten condition.

Extrusion variables applicable to the apparatus of FIG. 1 include such operations as effecting flow of extrusion material, varying said flow by varying the force thereon, varying the temperature of the extrusion material and, in certain instances, varying the shape of the extrusion. Such variables may be predeterminately controlled to provide an extrusion of predetermined physical characteristics by means such as described and illustrated in said copending application Ser. No. 142,405 which includes a programmable automatic control means for controlling extrusion material flow, mandrel movement, tooling and extrusion drawing equipment during an extrusion cycle. Other variables applied in operating the apparatus of FIG. 1 may include the provision of suitable induction energy to the extrusion apparatus and material to render same molten or soft or unite same, the provision of vibratory energy to the material and die to unite, compact, move and structurally affect the extrusion material, the intermittent generation of an intense magnetic field about the extrusion chamber, die and/or extrusion per se to effect compaction of the extrusion material to unite, effect the flow thereof and improve the structure of the extrusion. Such variables may be predeterminately controlled by a program control means as provided in my said copending application which is operative to control and/or vary the electrical operation of transducing or coil power generating means for controlling the application of radiant energy to the extrusion while controlling material flow and other tooling to predetermine the shape and structure of the extrusion.

The extrusion apparatus provided herein may also be applicable to the extrusion of certain metals and ceramics which are difficult to extrude by conventional means or would ordinarily require excessively heavy tooling due to the high extrusion pressures required to extrude same. One or more forms of radiant energy as described may be applied per se or simultaneously to effect or facilitate extrusion by rendering the extrusion-material softer or more plastic and, in certain instances, inducing the flow thereof. The intensity and frequency of the applied radiant energy as well as the timing of its application during and extrusion cycle may be predeterminately varied during the initial stage of extrusion to effect proper extrusion and/or during the more advance stages of the extrusion cycle so as to effect predetermined changes and/or variations in the shape and structure of the extrusion or to predeterminately control same in accordance with variations in the shape of the extrusion, material thereof or variations in its flow and/or post working thereof. Certain heat transfer means such as fluid circulated through the extrusion die is also provided herein to affect extrusion and may be automatically controlled as described.

In FIG. 1 the extrusion apparatus 230 comprises an extrusion machine 231, the expressing end of which 232 is shown and includes an extrusion die 236 made of an assembly of a plurality of concentrically arranged components 237, 238 and 239. The innermost part 237 of the die defines the wall of the extrusion throat of opening 237' through which material is expressed and also defines a portion of the forward end of the extrusion chamber 235. A mandrel 243 is axially movable through the throat and a stop extrusion tool 247 is mounted on the face of the die and are both controllable as hereinabove described, to perform various shape changing functions on the extruding member 245 and-/or to effect one or more of various other operations on or in relation to the extrusion material as will hereafter be described. Die shells 237 and 238 are shaped with a plurality of cavities to define annular openings or voids 240 between the two when assembled in which induction heating coils 241 are provided for heating the extrusion material 245 entering the throat of the die to a semi-molten condition whereby it will enter said die in a more flowable and easier formable state. Other heating means such as resistance heating elements may also be provided in annular volumes 240 and the mandrel may also be heated by electrical resistance means embedded or secured therein and/or by induction heating means to coact with coil 241 in heating the extrusion material. A single spirally wound induction heating soil may be provided in a spiral cavity between 237 and 238 or a plurality of different and separately controllable induction or resistance coils may be provided in separate annular cavities.

The mating surfaces of die parts 238 and 239 are shaped with a plurality of channels therein defining a plurality of annular or spiralling cavities 242 through which a heat transfer liquid may be circulated for removing heat generated by the heating means 241 from the die itself. Coolant liquid may also be circulated through the end block 233 of the die to remove heat from the extrusion, if necessary to retain the shape thereof beyond the die. However, if a blade operated stop-extrusion tool 247 as described is employed ducts 242' in 233 may either be closed off or eliminated.

Situated beyond the extruder is a power operated conveyor 246 for conveying the extrusion therefrom. Notation 248 refers to a housing enclosing the volume surrounding the extrusion 245 which housing is preferably pressurized with an inert or non-oxidizing atmosphere to prevent rapid oxidation of the extrusion material at the high temperature at which it is extruded. The housing 248 may be totally enclosed during operation of the extruder with means provided therein for coiling or cutting and stacking lengths of the extrusion 245 or may have an end wall adapted with a means for permitting passage of the extrusion therethrough without permitting oxygen or air from entering and passing to the immediate volume near the end of the extruder. Notation 249 refers to a means such as a duct terminating a fluid supply system for flowing coolant fluid such as inert gas, or a liquid against the surface of the extrusion 245 to reduce its temperature.

Modes of operation of the apparatus of FIG. 1 are presented as follows:

I. The extrusion material 245 is a metal supplied as a billet or slug and the extrusion prime mover is a hydraulically operated piston. Resistance to the movement of the material through the die is substantially reduced by heating the material immediately before and in the extrusion die to a semi-molten state thereby reducing the pressure required for extrusion. Heating means as described may also be provided for some distance along the wall of the extrusion chamber as well as the die. The entire extrusion chamber and die may also be heated by an external induction heating coil or coils circumscribing the end of the chamber and die as provided for in the various drawings or otherwise.

II. The extrusion material 245 is a powdered metal which is moved by a piston or screw. The induction heating means heats and either sinters the powder particles or causes the powder to become molten or semi-molten in the extrusion die resulting in the formation of a non-porous extruded shape. Depending on the pressure at which the powder is supplied to the die and the degree of heating effected, porous metal tubes or other shapes may also be formed in the apparatus of FIG. 1.

III. The extrusion material 245 is a homogeneous mixture of a thermoplastic powder such as powdered metal or plastic and a ceramic material such as a metal oxide, or other refractory. Heating of the mixture at the throat of the die melts the thermoplastic material which fuses thereafter into an extruded member in which the ceramic material is bonded by the thermoplastic material.

IV. In a preferred embodiment, the mandrel 243 is eliminated and the wall of the extrusion chamber is substantially cylindrical in shape. An elongated billet of metal such as aluminum is introduced into the charging end of the extruder (not shown) and forced by means of a piston drive to the face of the extrusion die. The diameter of the cylindrical billet is substantially equal to the diameter of inside of the extrusion chamber. The induction heating means is provided so that the nose end of the billet, which may be shaped to the contour of the entrance end of the die, is heated, shortly after entering the induction heating zone, to a semi-molten condition whereby metal starts to flow into the die chamber 248 with the continued application of pressure by means of the piston of the solid and relatively cooler end of the solid billet. Programmed control of the servos feeding the billet and operating the post forming tools such a stop extrustion tool 247 and the conveyor drive motor for moving the extrusion away from the extruder. The means for electrically energizing the induction heating coils 241 may also be controlled by said programming means by means of a servo controlled by said programming means as described, which servo is operative to vary the power input to said induction coils by varying a resistance control or the like which governs the power output of the radio frequency generator coupled to said coils.

Additional variations and improvements in the operation of the apparatus of FIG. 1 which are considered part of this invention are noted as follows:

V. The extruder feed means, such as a piston driven by a hydraulic ram or a conventional extrusion screw, may be either intermittently operated or pulsed at one or more frequencies during an extrusion cycle during predetermined points in an extrusion cycle or continuously during the extrusion. The purpose of such oscillation or pulsing of the piston may be severalfold. Pressure or shock waves imparted to the feeding billet by rapidly oscillating the piston will be transmitted to the extrusion material entering the die as well as to that leaving the extruder and may be utilized, if the piston oscillations are such to apply substantial shock forces to the billet or compacted extruding plastic or powder to compact the material in the throat of the extrusion die whereby the grain structure of the metal is changed to provide an extrusion made of a metal having a predetermined crystaline structure and/or improved grain boundary structure. If the extrusion material is ultrapure metal or alloys free of unwanted impurities, which would ordinarily affect crystal growth or grain boundary structure and is processed in the extrusion chamber at temperatures in the molten or semi-molten range for the metal in a manner such that the crystalline structure is determined as the metal solidifies in the extrusion die, the imparting of high energy pulses or shock waves to the metal as it extrudes or during intervals just prior to its extrusion will effect the grain or crystalline structure of the metal and may be utilized, depending on the potential of the forces applied thereto, their frequency and the characteristics of the material being extruded, to orient the metal crystals and determine their shape. For example, it is known that ferrous metals having a crystalline structure defined by long crystals has a substantially greater yield strength than the same material having a crystalline structure composed of shorter crystals. Imparting intermittent blows to the semi-molten extruding metal by means of oscillating the prime mover such as piston 262 (FIG 3), in the act of feeding the metal through the die and/or while said metal is restrained in its movement, will affect and determine the shape of the crystalline structure of the extruded material as well as the characteristics of the grain boundaries between crystals.

One or more of various other forms of energy may also be utilized per se or in coaction with others of the oscillatory movement of the material drive means, which oscillation may occur in unidirectional steps and/or by retraction from the rear face of the billet or metal mass 250 followed by the rapid advancement there against to set up a shock wave in the metal as well as to advance it through the die or compress it prior to movement through the die. Of the other forms of energy applicable for working the extruding material or a portion thereof prior to extrusion for affecting the micro-structure of the material, the use of high frequency or direct current magnetic induction energy applied for predetermined periods of time or pulsed under control of a programming means as described, is hereby proposed to improve the characteristics of the extrusion material., such as by controlling the crystalline structure of the metal. Induction energy, which may also be applied as a constant, steady state phenomenon of substantially high enough magnetic force or field strength to control or effect crystal growth during extrusion or as a high frequency oscillating field in the semi-molten metal, may be applied by means of induction coils provided in the die wall as described and/or in the mandrel, or piston driving the metal mass. Ultrasonic energy may also be imparted to the extruding material to affect its internal structure by magnetostrictively vibrating the piston, mandrel or part of the die or by means of an ultrasonic transducer mounted within the mandrel, in the wall of the die or coupled thereto. The prime mover for the material such as a piston or extrusion screw, may also contain one or more ultrasonic transducers coupled therein or thereto for imparting high frequency and high energy to the semi-molten material at the extrusion throat and/or the material in the extrusion chamber proper or a coil external of the extrusion chamber may be used.

Since crystal growth is also affected by the manner in which the metal is cooled beyond the extruder and accordingly, one or more automatically controlled inert gas flow cooling devices such as 249 are provided beyond the extruder in the enclosure 248 to control the cooling of the extruding material 245. A feedback control loop may be provided to sense and measure the temperature along different points of the extrusion material 245 and control the flow of different coolant materials through plural ejectors 249 to control the manner in which the extrusion cools and/or control the rate of flow of material through the extruder to control the speed of 245.

Further modes of operation of the apparatus of FIG. 1 are noted as follows:

VI. The mandrel or stop-extrusion blade 247' may be shaped such that when they are projected into or across the opening in the extrusion die either will completely close off said opening, and prevent the flow of material therethrough. In such a state, the extrusion chamber is essentially a closed die in which the metal or material therein may be cold or hot worked by compression as described to a predetermined internal structure prior to extrusion of all or part of said material to shape in the die. If a piston or screw is used to advance a fluent or semi-molten solid material through the extruder they may be operated for a predetermined time interval to compact the extrusion material to a predetermined physical state either by a single compressional movement of the piston or screw or by means of a plurality of compacting movements resulting from either oscillation of the shaft on which the device is mounted, ultrasonic or magnetoscrictive vibrations imparted to the piston, screw or their shafts or intermittent explosive means to be described hereafter. Compacting the material to improve the physical characteristics thereof prior to extrusion by means of a single compressional movement of the piston or screw may be controlled by a programming means as described in which a feedback signal is derived from a pressure transducer terminating in the extrusion chamber and is compared with a reproduction of a recorded signal of predetermined characteristic so that when a null condition exists, indicating that the force applied or the pressure within the extrusion chamber is at a predetermined value an output signal is derived for controlling the servo advancing the piston or rotating the screw and/or for controlling the mandrel or blade to retract.

Also shown in FIG. 1 in block notation is a power supply 220 the output 221 of which is connected to a switch 222 having its output 223 connected to the induction or magnetic coil 241 disposed in or around the extrusion chamber or die as described. An input 224 to the switching input of switch 222 extends from an automatic controller as described for operating the switch to energize and deenergize the coil. If tool 247' retains extrusion from flowing through the die during the period it is being worked, the mandrel may be vibrated in or against the face of the die opening per se or in coaction with the movement and/or vibration of the material feed piston or screw for compacting and working the material immediately adjacent the end of the mandrel and/or within the die itself. In another form, the mandrel is designed to both prevent movement of material out of the die and physically work by compacting and/or vibrating the extrusion material. For example, the mandrel may have a step in it nose with a larger diameter shaped to close off the extrusion opening by engagement of the inside face of the die and with a smaller diameter portion at its end which is magnetostrictively or otherwise vibrated to impart vibrations to the material in the die which is restrained from movement therethrough either by the extrusion itself or by the closure of the die opening by advancement of the stop extrusion blade thereacross. The smaller diameter portion of the mandrel may also be a separate unit or submandrel which is oscillated within the larger mandrel portion closing off the die opening by engagement with the face of the die. The sub-mandrel is oscillated by magnetostrictive or pulsed hydraulic means to impart vibrations to the material in the die and/or to compact it to s predetermined density or structure while the blade 247' is advanced to confine material in the die. This action may also occur while the material 245 confined within the extrusion chamber by the mandrel closure thereof and the piston or screw is worked or physically changed by the action of the oscillating piston, or screw or by a predetermined compressional movement of the piston or rotation of the screw.

If a solid slug of a material such as a billet of metal is the extrusion, the shape of the die opening and the billet may be such that sufficient restriction to the forward flow of material is effected to permit the material of the billet to be intermittently worked or microstructurally changed by means of vibrations imparted thereto by the piston driving said billet or a transducer mounted in the piston either as a result of oscillation of the piston in moving the material thru the die or as a supplemental vibration imparted thereto as the piston moves forward. However, the extrusion material may be restrained during a predetermined interval in an extrusion or working cycle by either advancing the stop extrusion blade 247' across the opening or frictionally engaging the extrusion 245' beyond the die to prevent its forward movement during the interval the material within the extrusion chamber is being compacted or worked. Powdered metals, combinations of metals and ceramic powders, premixes of metals and/or ceramic powders containing filament or whisker reinforcements and other materials may thus be extruded in a technique employing a means for restraining the movement of the extruded portion of the material for a predetermined interval in an extrusion cycle and compacting the material in the extrusion die when so held, preferably while it is heated by the means provided hereinabove to sinter and/or melt the individual particles or powdered metal. All servos for effecting this action may be under the control of an automatic control system as described employing feedback for temperature and pressure control.

In FIG. 2 the above described mandrel and sub-mandrel moveable in the mandrel are illustrated. The outer mandrel 243a is shaped externally so that when it is advanced against the face 237' of the extrusion die 236, it will seat thereagainst and effect a sealed closure between the interior of the main extrusion chamber and the die opening. If the stop extrusion tool 247' is advanced as illustrated to close off the die opening, the inner mandrel 243b which is longitudinally movable by a separate servo means within mandrel 243a, may be oscillated or advanced to compact the material in the confined volume and utilized to either shape said material and/or work it to improve its internal structure. It is noted that the position of the sub-mandrel 243b during the forward movement of mandrel 243a will determine the amount of material eventually being shaped or worked in the confined volume defined by the die wall and the degree said material is compacted or compressed during said forward movement. Accordingly, the sub-mandrel may be fixed in relation to the mandrel portion 243a and either used per se to compact and shape or work the material confined in the die or vibrated by magnetostrictive means when so advanced and/or during its movement into the die.

The above described processes for working and shaping a material by extrusion may be accomplished with or without the application of heat depending on the material and the desired results, and with further processing such as irradiation or neutron bombardment of the material as it extrudes to change it chemical and/or physical characteristics. As stated, a source of neutrons or high energy particles may be mounted in the mandrel and/or within the die wall. Bombardment or irradiation may be effected as the material is retained within the die as described and/or as it moves therethrough. If the material is heated, it may be micro-structurally improved by subjecting it to magnetic induction energy by means of the proper induction coils provided in the mandrel, die or extrusion chamber. Such magnetically induced changes in the structure of the material may be effected while it is moving through the extrusion die and/or while confined therein or merely stopped. The operation of a magnetic induction means, which may also be the heating induction means or adjacent thereto, may be controlled as described in accordance with a programming means, or may be a continuous and predetermined effect as the material is extruded.

The provision of a movable mandrel such as 233 of FIG. 1 may be utilized to continuously add a material to the extrusion material as follows. If the mandrel is suddenly retracted during extrusion, a void will be formed in front of the mandrel which void will either fill shortly thereafter with extrusion material 245 or may remain if the prime mover for the material is stopped in its operation as or prior to the retraction of the mandrel. A predetermined quantity of a second material may be fed through the mandrel to fill or partly fill this void which second material may be encapsulated in or mixed with the extrusion material depending on the physical characteristics of the extrusion material and the subsequent action of the mandrel in forcing the material admitted therethrough into the extrusion material. Fiber or whisker reinforcements may thus be admitted through mandrel 243 and combined with semi-molten or powdered metal to form composite extrusions of composite materials. The action may be simplified if the heating coils are placed just in advance of the mandrel to make the metal being extruded semi-molten at the position where the material is fed through the mandrel thereto.

Vibration or oscillation of the extrusion feed piston to incrementally advance same may be used as the sole driving force for the billet or powdered charge of extrusion material in which case the force of the oscillations is preferably applied to the piston by pulsing the hydraulic or pneumatic cylinder driving the piston. However, oscillation of the piston may also be applied in coaction with the primary force applied as a steady pressure to the cylinder driving the piston and may be applied by means of an auxiliary intermittent motion generator also coupled to the piston such as an electro-mechanical, pneumatic or hydraulic vibrator. The piston itself or a portion thereof may be magnetostrictively vibrated by coupling it to a source of varying magnetic energy or a variable magnetic field. Said magnetic coupling may also be effected on the billet itself, if ferromagnetic in nature by means of the proper induction coils mounted exterior of the extruder in the walls thereof.

Shock waves may also be transmitted to the extruding material through the piston or mandrel by fluid pressure means. Pulsing the hydraulic servo operating either or both devices may suffice. Or, an intermittently exploded gas behind the extrusion piston may serve to drive the extrusion material through the die and/or effect the desired internal changes in said material as it is shaped in the die. The piston drive means (not shown) may be eliminated and replaced with an explosive charge operating in an enclosed chamber coupled to the extrusion chamber or an extension thereof and communicating with the rear face of the piston for forwardly driving said piston and effecting extrusion of the billet or mixture in advance thereof either in a single projection thereof resulting from the explosion of a single charge of explosive or explosive gas mixture or from a plurality of explosions which progressively advance the material through the die. Metals such as titanium, zirconium and the like may be easily formed in a single extrusion shot by such a method.

The above described explosion extrusion technique may be employed to extrude materials in an ambient state or at room temperature. However, if a single explosion is employed to drive a billet or slug of metal through the extrusion die, the entire slug is preferably heated to a molten or semi-molten state either in the extrusion die by induction means or prior to placement therein. For the process employing a plurality of explosions behind the piston, the forward end of the billet may be induction heated as described to a condition and for a length of said extrusion such that a predetermined length of the billet is advanced through the die with each explosion or group of explosions. Here again, the explosions or pressure pulses may be so timed that a portion of the shock forces applied to the end of the billet is effective in compacting the metal being extruded to a degree to substantially work the metal to improve its crystalline structure and grain boundaries characteristics. A closed, impact extrusion die may also be used.

Explosive forces or shock waves may also be applied directly to the rear face of the billet by eliminating the piston and providing the billet of such a shape relative to the cross section of the extrusion chamber that sufficient force is imparted by the explosion to the billet to effect extrusion and working of the material being extruded as well as the billet proper. Shock forces may be generated behind the piston or billet by generating a spark in a fluid or liquid per se or by explosively burning a gas or solid.

If a screw is employed for feeding material to the extrusion die it may be oscillated while rotating or between periods of rotation to physically work, as described and/or feed material to the extrusion die. Hydraulic, mechanical or magnetostrictive coupling means may be used to oscillate the screw to obtain the desired to work and deliver the extruding material.

The mandrel 243 may also be oscillated per se or in coaction with the oscillation of the piston or ram feeding the billet or plastic extrusion material 245. Operation of the piston and/or mandrel during an extrusion cycle may be automatic or under the control of a programming means as described to occur during predetermined points or intervals during an extrusion cycle to impart predetermined physical characteristics to predetersegments or portions of the extrusion. High frequency oscillation of the mandrel 243 while immediately in front of or inserted in the throat of the extrusion die during the extrusion of a tubular member or the like may be utilized to effect the physical characteristics of the material of the extruding member. For example, if the mandrel 243 is magnetostrictively or otherwise oscillated in the ultrasonic range or at lower frequencies and the extrusion material 245 is a thermoplastic the polymerization characteristics of the material being shaped in the die may be changed in comparison to the polymerization and molecular structure of the same thermoplastic not so affected by high frequency vibrations imparted to the semi-molten and solidifying plastic. Portions of the die may also be ultrasonically vibrated or vibrated at lower than ultrasonic frequencies by means of one or more transducers of the ultrasonic or magnetostrictive type, such as made of barium titanate or lead zirconate, which are ultrasonically energized and either coupled to the die, form part of the face of the die wall or are situated within the die throat such as in the mandrel or in a fixed retainer. Co-action of the operation of the die ultrasonic vibration means with the mandrel vibration means and/or the drive piston vibration means may be affected whereby these components are oscillated in phase to cause desired and predetermined changes in the material being extruded as it solidifies for reducing or eliminating flaws in the grain boundaries of crystalline metal structures or improving the molecular structure and/or beneficially effecting polymerization of plastic materials passed through the extruder.

The vibration means described may be combined with the induction or other heating means described for the production of extruded shapes from various materials and for the shaping of elongated sintered members from powdered metal or powdered plastic per se or in combination with each other in a premix as well as premixed powders of metals and/or plastic and fiber fillers. Vibration of piston 262 and/or the mandrel may be used to compact the powder or premix as it enters the die to a degree such that when it sinters or the particles fuse, the structure and density of the material is predetermined.

Atomic bombardment or irradiation of the material being extruded may be effected by providing a source of the proper atomic radiation in the mandrel at the nose end thereof, in the die and/or just beyond the exit of the die to affect the physcial and chemical characteristics of the material being extruded, in a predetermined manner, and/or to create changes in material encapsulated in voids such as 41 of FIG. 1 provided in the extrusion by axial movement of the mandrel. The cross-linking of the molecules of certain plastics such as polyethylene as well as various chemical reactions or purification of encapsulated liquids held in the extrusion as described may thus be effected.

FIG. 3 illustrates in partial cross-section details of an explosion apparatus of the type hereinabove described. The apparatus 251 includes an elongated extrusion chamber 252 having a die 254 at one end thereof through which an extrusion material such as a solid billet or metal 250 is extruded to an elongated extrusion 250' of constant or variable cross-section as described. An extrusion piston 262 is shown in surface engagement with the end of the billet 250. Closure of the extrusion chamber after a billet or slug of metal is admitted thereto is effected by means of a cover plate or short chamber section 258 having a flange 268' which abuts a flange 253' at the end of cylindrical chamber 253. Secured to piston 262 is a shaft 263 which extends through the end wall of 258 from a lineal servo 265 such as a hydraulic cylinder. The cylinder is mounted on a base 266 which is also secured to the chamber member 258 and the base 266 is retractable leftward away from the main extrusion chamber 252 on a track 267 or guide by means of a servo (not shown) permitting the piston 262 to be withdrawn and a new charge or billet to be inserted in the opening to the interior of the extrusion chamber. Closure of 258 and 253 may be effected by means of clamping fixtures 257 which forcibly retain the flanges together when actuated by respective servos 256 and permit withdrawal of 258 from the front assembly 252 when unclamped by means of said servos. Notation 264 refers to a dynamic seal between the shaft 263 which effects a pressure seal between the interior volume 259 defined by the inside surface of the wall of 258 and the rear face of the piston 262.

Movement of the extrusion piston 262 against the billet or charge 250 is effected by introducing an explosive charge or mixture of combustable materials through an inlet nozzle 260 by control of a valve 261 and igniting the explosive material in the chamber 259 by means of a spark generated across the gap of a spark plug 268 which protrudes into the volume 259. The resultant explosion or pressure build up in the volume 259 is effective in driving the piston 262 against the charge or billet 250 with sufficient force to cause the material thereof to extrude through the opening 254 in die 254 as an elongated member 250' of predetermined shape. Depending on the kinetics of the explosion and the physical characteristics of the material comprising the billet or charge 250, one or a plurality of explosions may be employed to completely extrude said material through the die opening. If the material comprising 250 is a metal such as aluminum which has been heated to a semi-molten condition and the charge admitted to volume 259 is an explosive such as any conventional explosive used for blasting, said billet or charge 250 may be completely extruded as a result of a single explosion in the volume 259. In another form of the invention predetermined quantities of an explosive mixture are admitted to the volume 259 through one or more nozzles 260 by control of the inlet valve 261 and are intermittently exploded by sparking the electrodes of 268 to intermittently pulse the rear face of piston 262 and to cause it to step in the direction of the extrusion die whereby the material comprising 250 is progressively and intermittently advanced through said die.

The notation 265 refers to a hydraulic or pneumatic cylinder which may utilized either for merely retracting piston 262 at the end of an extrusion cycle or for supplementing or being supplemented by the intermittent forces applied to the rear face thereof in serving to move the billet 250 through the extruder in the act of extrusion. In other words both the action of the rapid combustion within the volume 259 and that of the lineal actuator 265 may be employed to effect extrusion. As stated above, the piston 262 may be completely eliminated by employing a properly designed billet or slug, the end-face of which is reacted on by the pressure wave or waves generated in the chamber volume 259 with each explosion to cause said billet or slug to be forced through the die opening 255. Notation 255' refers to a frame or support for supporting the assembly 252 as well as the clamping servos 256. All servos preferably controlled by either a multi-circuit timer or the like or by a switching means actuated when the piston has reached its forward most pisition. The piston 262 need not be projected to the immediate vicinity of the die 254 since it may be retracted, the section 258 removed, and a new billet placed within said die which is compressed by 262 against the remaining portion of the material previously extruded.

If solid slugs or billets of metal are employed for extrusion purposes, and an extrusion 250' is desired of a length which is greater than that obtainable from extruding a single billet, a longer length of extrusion may be dirived if a first billet is heated to a semi-molten state and is immediately extruded as described with the exception of a small length thereof defined by the end wall compressed by the piston which has not passed through the die opening. A new semi-molten charge when admitted to the interior of chamber 263 may be compressed by means of the piston 262 against the hot, rear face of the previously extruded material or slug and intergrully welded thereto by means of pressure so that the resulting extrusion is not interupted.

In FIG. 4 an apparatus 270 is provided including an elongated cylindrical extrusion chamber 271 having an opening near one end thereof defined by a cylindrical wall 271' normal to the longitudinal axis of 271 which wall terminates a hopper for feeding powdered or other material through a valve 279 to the interior of the extrusion chamber 271. Piston 275 is urged against the extrusion material 281 by means of a shaft 276 extending from a lineal servo or hydraulic cylinder 277. The shaft is supported in bearing by the end wall 273 of the extruder chamber 271.

Extrusion is effected by operating servo 277 to retract piston 275 a degree to clear the opening defined by the projecting portion 271'. The feed hopper 280 is vibrated causing the powdered material or fluent mixture therein to be feed through the valve 279 which is opened by means of a solenoid. Valve 279 closes after a predetermined interval in which a predetermined quantity of powdered metal or the like is passed therethrough to the chamber. The piston 275 is an automatically projected against the mass of powder of mixture 281 causing it to move towards the die 272 at the end of the extrusion chamber 271. The piston 275 may be oscillated a predetermined short stroke until sufficient material has entered the interior volume 271'' of the extrusion chamber which is heated thereat by means of the means provided in FIG. 1 and extruded as described in FIG. 1 through the die opening to form an extrusion 282. A mandrel apparatus illustrated in FIG. 1 and operated as described is not shown in FIG. 4 but is preferably utilized if the material being forced through the die is powder. However, the material admitted through the sub chamber 271' to the main extrusion chamber 271 may also comprise one or more slugs of solid metal which are heated to a soft, semi-molten or more easily extrudable state that when so admitted. A plurality of such slugs disposed end to end may be welded together or used to define a single elongated extrusion by the extrusion pressure applied thereto by piston 275 during a single stroke of said piston. The feeding of such slugs or short billets may also be on an individual basis whereby each slug is added to the extrusing mass already in the chamber in front of it through the hopper or other suitable feed means when the piston 275 is sufficiently retracted whereafter the piston is advanced sufficiently to move the newly admitted slug at least a distance along the extrusion chamber equivalent to the length of the slug. Intermittent operation of the piston and slug feeding means may thus comprise the improved extrusion technique and may employ one or more of the described auxilliary magnetic, vibrating or induction energy generating means to facilitate or enhance extrusion and the structure of the extruded material. Both slug feed and piston travel may be automatically controlled by the means hereinbefore described to optimize the extrusion process in accordance with variations in the operation of the described auxilliary material working apparatus.

Also shown in FIG. 4 is an annular housing 278 surrounding the extrusion chamber 271 and die 271d and containing a plurality of coils of electrically conduction wire designated 278'. The coils 278' may comprise one or more of the described induction heating coils or a superconducting magnet operative to generate an intense magnetic field a plurality of times during extrusion for compacting, uniting and/or advancing the extrusion material through the extrusion chamber and die. If the coils 278' define a superconducting magnet, said magnet may be automatically energized and deenergized by suitable electrical power supply means to generate and collapse or remove intense magnetic fields operative to compress and vibrate the walls of the extrusion chamber and said power means may be automatically controlled in timing the pulses of energy fed to the coils as well as intensity thereof by said described program control means used to control the operation and timing of the other extrusion variables. A superconducting magnet coil arrangement as provided in FIG. 4 may also surround the die and/or extrusion chambers of the other apparatus provided herein for similarly controlling and affecting extrusion.

In FIG. 5 is shown a modified form of the invention applicable for extruding metal into a die or for impact extrusion forming metal or ceramic materials disposed as a slug or powder in a die cavity. An impact extrusion die 283 is provided with a cavity 284 therein in which die a suitable material is disposed preferably of predetermined quantity or shape. Extrusion molding by means of the apparatus 282 of FIG. 5 may be effected in one of a number of techniques wherein extrusion material is either predeterminately disposed as a measured quantity of particulate material such as ceramics, metals, plastics or mixtures of these or a slug thereof within the cavity 284 of the die 283 or is extruded into said cavity by a piston 262' terminating an extrusion chamber 285 the open end 285' of which abuts the flanged face 283' of the die 283. A plunger or sub-piston 262" protrudes from the end of piston 262' and is either fixed or movable with respect to said piston. Means so provided in FIGS. 2 and 3 for moving the piston such as piston vibrating means, or explosion moving means, may be applied to move piston 262' and/or sub-piston 262" to move and shape the metal or other material disposed in the cavity 284. If piston 262" is movable within piston 262' one or more explosive charges may be admitted thereto for forcing piston 262" against the material being formed while piston 262' is held against the face of die 283. Radio frequency induction heating means may also be employed by means of suitable coils surrounding the die 284 as well as magnetic field generating means as described for working the impact extruded material and/or softening said to facilitate its working.

In another form of the invention, it is noted that the movable pistons 262, 275 and 262' of FIGS. 3, 4 and 5 may be repladed by a movable extrusion screw which may be rotated through their respective shafts such as 263 and 276 by replacing lineal acuators 265 and 277 with rotary motors which are mounted on a base which is urged for oscillation by means of a lineal motor so that the screw may be rotated when advanced into the extrusion chamber to force the material being extruded through the extrusion die and may either be simultaneously oscillated to effect the hereinabove described improvements in the extruded article or merely retracted after an extrusion cycle for the purpose of adding a new change to the extrusion chamber. Such a screw arrangement may be used particularly in FIG. 4 in which oscillation of the screw as or between periods of rotation thereof, is effective in compacting the extrusion material 281 during a period when the opening in the extrusion die is stopped or closed off by means of advancing a mandrel into said opening or a stop extrusion tool such as the hereinabove described blade across the face of the die and said opening. An extrusion cycle is thus possible in which one or more stop extrusion tools completely close off the die opening during a period that the extrusion material is being compressed by means of either a piston or screw during one or a multitude pulses imparted thereto for improving the characteristics of said material after which the stop extrusion tool is retracted and the material in the extrusion chamber is advanced by means of the piston or screw to effect the extrusion of either a small part of the material in the extruder or a substantial portion thereof. The movement of the stop extrusion tool in synchronization with the operation of the piston or screw in compacting the material is effected by control of the respective servos operating each of said tools. If the control of the induction heating means at the die itself as illustrated in FIG. 1 may also be in accordance with a particular extrusion cycle so that the charge at and immediately in front of the extrusion die is heated to a predetermined temperature just as or prior to the stop extrustion tool is advanced across the die opening and the material is compacted or internal forces are applied thereto by means of shock waves imparted to the billet so that the combination of stressing or compacting the material at or in front of the die is supplemented by heating the material to a predetermined temperature by high frequency waves generated therein. The same technique may be applicable to the apparatus illustrated in FIG. 5 for providing an impact extruded article of metal having superior physical characteristics.

In FIG. 6 is shown a modified form of the invention applicable to any of the hereinbefore described apparatus wherein an extruder is provided with a modified die arrangement including a die 286 having a mandrel 288 extending through the die opening for producing a hollow or tubular extrusion 286' having an inside surface 286" which is defined by and rides against the outer surface of mandrel 288. The mandrel 288 is hollow having a passageway 289 extending axially therethrough in which passageway is disposed a device 290 such as a laser, electron gun or other source of intense radiation such as a source of atomic radiation. The cavity or passageway 289 is flared or expanded at the end of the madnrel 288 permitting radiation from source 290 to be directed against the wall surface 286" of the extrusion a short distance beyond the end of the mandrel. The source of radiation 290 may be fixed and/or movable near the end of the mandrel and operative to irradiate the wall of the extrusion and/or penetrate same for enhancing or changing the characteristics thereof or for inspection purposes involving detection means mounted exterior of the extrusion.

In a further form of the invention, it is noted that a plurality of superconducting magnets may be disposed within and/or surrounding the extrusion chamber, die or extruded shape itself and may be intermittently pulsed by suitable controlled power means in a manner to induce the flow of solid or molten extrusion material through the extrusion chamber and die and/or the extruded shape itself by applying tandem arrays of magnetic field of suitable flux densities having force components in the direction of extrusion. In other words, such apparatus may be used to generate essentially impacting pulsations in the material being extruded and/or the extrusion itself having force components in the direction of extrusion operative to intermittently drive or inch the extrusion and/or extruding material towards and away from the extrusion die to effect forcing the material through the die and/or removing it therefrom by the magnetically generated force per se or in cooperation with the operation of a prime moving means as described. Such material movement may be effected by suitably shaping and positioning the plurality of superconducting magnets and properly sequentially energizing and deenergizing same. Such varying magnetic fields applied to different portions of the extruding material or extrusion may have the effect of setting up intermittent shock waves in the extrusion or extruding material which may serve to work same as described hereinbefore and the fields may be generated and removed or collapsed in such a manner as to generate waves in the material at a resonant frequency thereof. The technique may be applied to move a variety of shapes and devices through various apparatus and, in certain instances, work said shapes simultaneously as they are moved such as by stretching or compacting same or forcing said shapes against dies such as roller die means or through die openings.

In another form of the invention employing forces generated by a magnetic field or fields of high flux densities, a superconducting magnet or magnets may be disposed adjacent the extrusion chamber, die or the extrusion itself and may be rotated while energized in a manner to create a net moving force on the extrusion or in the extrusion material in the direction of extrusion to effect or assist in the movement thereof in the direction of extrusion. The superconducting magnet or magnets may be continuously or intermittently energized during rotation thereof to impart either a steady force or pulses to the extrusion or extruding material for moving and/or working same. Such arrangement may also be utilized to move other shapes and articles formed by techniques other than extrusion, along a predetermined path during processing or transporting same.

In FIG. 3 notation 269 refers to an annular housing or die disposed downstream of the extrusion apparatus 251 and operative to receive the extrusion. One or more induction coils or superconducting magnet coils 269' are disposed in the housing 269 surrounding the passageway therethrough for operating on and or moving the extrusion therethrough as described.

I claim:

1. An extrusion apparatus comprising in combination:

an extrusion die, an extrusion chamber connected to said extrusion die, piston means for feeding an extrusion material to be shaped in said die from said chamber to said die, said die defined by a passageway and an opening from which the extrusion shaped in said die may pass from said die, means for closing said die opening to prevent the flow of extrusion material from said die, means for imparting oscillatory movement to said piston means while retaining a predetermined quantity of extrusion material disposed between said piston means and said die to cause said piston means to apply a series of impact forces to said predetermined quantity of extrusion material and while said means for closing said die opening is operatively closing said die opening so as to intermittently work said predetermined quantity of extrusion material while it is held within said chamber and said die, and means for operating said die closing means to an open condition so as to permit movement of said predetermined quantity of extrusion material from said die after said intermittently applied forces have predeterminately worked said extrusion material within said extrusion chamber and said die.

2. An extrusion apparatus in accordance with claim 1 wherein said means for closing said extrusion die opening comprises tooling supported by said die, which tooling includes a means operable to extend across the opening in said die for preventing the passage of extrudate from the die and power operated means for extending said closing means across said die opening, said power operated means being also operable to retract said die closing means so as to effect the opening of said die to permit movement of said extrudate from said die after it has been worked by said series of impact forces applied thereto by said piston.

3. An extrusion apparatus in accordance with claim 1 wherein said means operable to extend across said die opening comprises a blade supported against the face of said die and a lineal actuator connected to said blade for advancing said blade across the die face for blocking the opening therein.

4. An extrusion apparatus in accordance with claim 1 wherein said means for applying a series of impact forces to said extrusion material includes a magnetic field generating coil radially disposed with respect to said die and means for intermittently electrically energizing said coil to intermittently generate a magnetic field which is operable to impact intermittent forces to said extrusion material.

5. Apparatus for forming an extrudable material to shape comprising in combination with a material forming means including a die having an opening terminating a passageway therethrough in which die extrudable material may be formed to shape, prime moving means operable for feeding extrusion material to said die and to force said extrusion material through said die for forming said extrusion material to shape, electromagnetic field generating means radially disposed around and along said passageway through said die and means for electrically energizing said electromagnetic field generating means to generate a magnetic field which magnetic field is operable to apply a force to the extrusion material in said die which force is of sufficient intensity to predeterminately work said extrusion material as said extrusion material is fed through said die.

6. An apparatus in accordance with claim 5 including means for intermittently energizing said magnetic field generating means so as to vary the magnetic field generated thereby and to apply an intermittent force to said extrusion material.

7. An apparatus in accordance with claim 5 wherein said electromagnetic field generating means includes a current conducting coil which is integrally assembled to and forms part of said die.

8. An apparatus in accordance with claim 5 wherein said magnetic field generating coil means is operable, when energized to generate a shock wave in the extrusion material.

9. An apparatus for forming an extrudable material to shape comprising in combination with a shaping means for an extrudable material having a passageway defining a wall portion for determining the shape of material disposed in a first condition therein, power operated means for forcing a solid extrudable material through said passageway to form same in the shape of said shaping means, magnetic field generating means disposed radially with respect to said passageway, means for electrically energizing said magnetic field generating means to generate a magnetic field of sufficient intensity to react on the solid extrudable material disposed within said shaping means to react on
    said extrudable material within said shaping means and to change its physical structure.

10. An apparatus in accordance with claim 9 wherein said shaping means is a die and means for intermittently energizing said magnetic field generating means in a manner to intermittently impart forces on said solid extrudable material disposed within said shaping means so as to intermittently work said solid extrudable material and to advance it through said die.

* * * * *